United States Patent
Wisse et al.

(10) Patent No.: US 10,743,511 B2
(45) Date of Patent: Aug. 18, 2020

(54) MILKING ROBOT WITH KICK DETECTION

(71) Applicant: LELY PATENT N.V., Maassluis (NL)

(72) Inventors: Dik-Jan Wisse, Maassluis (NL); Paulus Jacobus Maria Van Adrichem, Maassluis (NL); Karel Van Den Berg, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 106 days.

(21) Appl. No.: 15/761,593

(22) PCT Filed: Jul. 28, 2016

(86) PCT No.: PCT/NL2016/050560
§ 371 (c)(1),
(2) Date: Mar. 20, 2018

(87) PCT Pub. No.: WO2017/052361
PCT Pub. Date: Mar. 30, 2017

(65) Prior Publication Data
US 2018/0343823 A1    Dec. 6, 2018

(30) Foreign Application Priority Data
Sep. 22, 2015 (NL) .................................. 2015478

(51) Int. Cl.
*A01J 5/017* (2006.01)
*A01J 5/04* (2006.01)
*B25J 11/00* (2006.01)

(52) U.S. Cl.
CPC .............. *A01J 5/017* (2013.01); *A01J 5/048* (2013.01); *B25J 11/0045* (2013.01)

(58) Field of Classification Search
CPC .................................. A01J 5/017; A01J 5/048
See application file for complete search history.

(56) References Cited

U.S. PATENT DOCUMENTS 4,263,874 A * 4/1981 Flocchini ............... A01J 5/017
119/14.08
2009/0271033 A1 10/2009 Van Der Tol et al.
(Continued)

FOREIGN PATENT DOCUMENTS

EP    1514469 A1 *  3/2005  ............. A01J 5/007
EP    1668980 A1 *  6/2006  ............. A01J 5/007
(Continued)

OTHER PUBLICATIONS

International Search Report dated Nov. 9, 2016 in PCT/NL2016/050560 filed Jul. 28, 2016.

*Primary Examiner* — Kristen C Hayes
(74) *Attorney, Agent, or Firm* — Oblon, McClelland, Maier & Neustadt, L.L.P.

(57) ABSTRACT

A milking robot for completely automatically performing a teat-related action on a dairy animal. The robot includes a frame with a movable arm structure and a robot arm and actuators, a teat cup, a flexible connecting means connected between the teat cup and the arm structure, a retracting device for pulling the teat cup back onto the arm structure by means of the connecting means, a vacuum device for applying a milking vacuum to the teat cup, and a control unit for controlling the milking robot. The robot further includes at least one of an arm structure position-determining device for determining a measured value relating to an arm structure position, and an arm structure acceleration-determining device for determining an arm structure acceleration. The control unit is configured to control the retracting device and/or the vacuum device, if the determined measured value satisfies a predetermined measured value criterion.

20 Claims, 3 Drawing Sheets

(56) References Cited

U.S. PATENT DOCUMENTS

| | | |
|---|---|---|
| 2011/0048329 A1 | 3/2011 | Van Den Berg |
| 2012/0312237 A1* | 12/2012 | Hansen .................. A01J 5/017 119/14.02 |
| 2015/0020739 A1 | 1/2015 | Krone et al. |

FOREIGN PATENT DOCUMENTS

| | | | |
|---|---|---|---|
| EP | 2 111 750 A1 | 10/2009 | |
| WO | 2008/030085 A1 | 3/2008 | |
| WO | WO-2012170293 A1 * | 12/2012 | ............. A01J 5/007 |
| WO | 2013/135829 A1 | 9/2013 | |
| WO | WO-2017052361 A1 * | 3/2017 | ............. A01J 5/017 |

\* cited by examiner

MILKING ROBOT WITH KICK DETECTION

The invention relates to a milking robot for completely automatically performing a teat-related action, in particular milking, on a dairy animal, comprising a frame with an arm structure which is movable with respect thereto and comprising a robot arm and one or more actuators for moving the arm structure, in particular the robot arm, a teat cup, in particular a milking cup, a flexible connecting means connected between the teat cup and the arm structure, a retracting device for pulling the teat cup back onto the arm structure by means of the connecting means, a vacuum device for applying a milking vacuum to the teat cup, and a control unit for controlling the milking robot.

Such milking robots are known per se. In practice, there are cases where a dairy animal which is, for example, being milked using milking cups, become irritated by these milking cups, or, for example, become nervous. Thus, it regularly occurs that the dairy animal makes a kicking movement, resulting in one or more milking cups being kicked off. The milking cups themselves may then come into contact with dirt, such as manure, sawdust and the like, but it is also possible for dirt to be sucked into the milking line on account of the milking vacuum which has been applied. In order to limit this as much as possible, the milking vacuum is closed off from the milking cup(s) which have been hit and the latter is/are then pulled back onto the arm structure. In order to determine which milking cup(s) has/have been hit, a change in the air flow through the milking cup is used, for example. If the air flow is suddenly much higher, it is inferred that the milking cup has dropped off. Furthermore, it is known from WO0013490 to fit an accelerometer to a milking cup. When it measures an acceleration which approximately corresponds to the gravitational acceleration, a control unit infers that the milking cup has dropped off.

A drawback of the known device is that it often reacts too late in practice, and that the milking cup still comes into contact with dirt and/or sucks up dirt by switching off the milking vacuum too late. Another drawback is that the milking lines of the teat cups may become entangled or damaged as a result of being stepped on. All this is obviously undesirable.

It is an object of the present invention to provide an improved milking robot which suffers from the abovementioned drawback to a lesser degree. The invention achieves this object by means of a milking robot as claimed in claim 1, in particular a milking robot for completely automatically performing a teat-related action, in particular milking, on a dairy animal, comprising a frame with an arm structure which is movable with respect thereto and comprising a robot arm and one or more actuators for moving the arm structure, in particular the robot arm, a teat cup, in particular a milking cup, a flexible connecting means connected between the teat cup and the arm structure, a retracting device for pulling the teat cup back onto the arm structure by means of the connecting means, a vacuum device for applying a milking vacuum to the teat cup, a control unit for controlling the milking robot, at least one of an arm structure position-determining device for determining a measured value relating to an arm structure position, and an arm structure acceleration-determining device for determining a measured value relating to an arm structure acceleration, wherein the control unit is configured to control the retracting device for pulling back the teat cup onto the arm structure and/or to control the vacuum device for closing off the milking vacuum from the teat cup, if the determined measured value satisfies a predetermined measured value criterion. In this case, the invention uses the following insight. If, as in the prior art, the teat cup is being considered, such as the acceleration thereof is measured, a reaction will always in principle follow too late. This is due to the fact that, when a free fall acceleration is being measured, the teat cup is already detached from the teat. By contrast, with the milking robot according to the invention, there is still some time between determining an unfavorable movement or position of the arm structure and the possible detachment of the teat cup. This is due to the fact that the position or movement of the arm structure is being measured and there is some tolerance between the arm structure and the teat cups, precisely because the teat cups are not directly connected thereto, but via a flexible connecting means. Thus, for example also when a cow kicks the arm downwards, it will take some time before the tension on the connecting means becomes so great that it pulls the teat cup downwards as well, away from the teat. Thus, the invention provides the possibility of already uncoupling the milking vacuum before the teat cup comes away from the teat or could even hit the ground. Although all this depends slightly on the speed with which a position or acceleration is determined and on the speed with which a control unit subsequently decides to perform an action, it will be clear that at least the possibility of reacting more quickly has been provided. Furthermore, it is possible to already perform the retracting action, at least to start it, i.e. before the teat cups touch the ground and can be trampled on or come into contact with dirt. In addition, the timely withdrawal ensures that the movements the teat cups can make with respect to the arm structure are smaller. After all, the connecting means can be pulled taut and retracted sooner. Because of a reduced possibility of wild movements, the risk of the milking lines and teat cups becoming entangled is reduced.

With this insight, it should be noted that in this case, use is advantageously, but not necessarily, made of prediction. This is due to the fact that the aim is to prevent the negative results of the milking cups being kicked off in an uncontrolled manner, namely by already taking preventive measures, such as uncoupling the milking vacuum before the milking cups are actually kicked off or at least leads to these results. This means that in particular the (or each) criterion is determined on the basis of experience or models, and that sometimes the milking vacuum may be uncoupled or the teat cup may be withdrawn without this being necessary. The consideration here is how much time or capacity is required to reattach the cups versus the drawbacks of the (risk of) soiling of the system or even of the milk.

In the present application, an "arm structure comprising a robot arm" is understood to mean that a structure is provided which is configured to carry the teat cup as well as a movable device for displacing this structure. The movable device may then be referred to as the "robot arm". It is, for example, possible to refer to the entire robot arm and milking cup carrier, as used in the Lely Astronaut® milking robot, as "robot arm" or "robot arm structure". In other cases, a movable robot arm picks up a structure comprising a plurality of teat cups. After the structure has been picked up, the unit as a whole is then also comprised of such an arm structure with robot arm, see for example, the structure as described in WO2013135829.

The control of the vacuum device for closing off the milking vacuum of the teat cup may be configured in many different ways. Thus, a valve may be provided which closes off the vacuum connection. In that case, closing this valve is already sufficient and the control unit is then configured accordingly. Such a valve is often provided anyway in order to prevent dirt from continuously being sucked in via the milking cup (just) before the milking cup has been attached. However, it is also possible to switch off a pump or to take any other measure.

The control of the retracting device for pulling the teat cup back onto the arm structure may also be configured in many different ways, but will often have to comprise no more than the retracting device which is already configured to pull back the teat cup onto the arm structure at the end of the animal-related action, such as the milking cup after milking. During, for example, milking, the teat cup is coupled to the teat and no longer directly connected to the arm structure, but via the flexible connecting means, so that there is a certain degree of freedom of movement.

In this case, it should also be noted that the invention applies to an arm structure on which the teat cup is provided and to which the teat cup is pulled back after the teat-related action, wherein the teat cup remains connected to the arm structure via the connecting means. Other known milking robot systems, such as the DeLaval VMS and the SAC RDS Futureline, use an arm structure which grasps a teat cup from a magazine and takes it to the teat. In this case, the teat cup is securely connected to the arm structure during the attaching action and as soon as the teat cup is attached, there is no longer any connection between the teat cup and the arm structure. Therefore, it is only of limited use to measure the position or movement of the arm structure with such systems. This is due to the fact that, as long as the teat cup has not been attached yet, the milking vacuum is not yet connected to the interior of the teat cup while the teat cup is securely held by the arm structure and cannot fall on the ground. But as soon as the teat cup is attached, the milking vacuum is applied to the teat cup and there is a risk of sucking in dirt, there is no longer any connection to the arm structure. As a result thereof, kicking off of a teat cup does not have a negative effect on the teat cup with this known system.

Furthermore, it should be noted here that the control unit of the milking robot may be a single control unit or computer, but may also be a distributed or modular control unit for controlling the sub-devices of the milking robot, such as a vacuum system, a milk pump, a teat-detecting system, etcetera.

The invention will now be explained in more detail in a non-limiting manner by means of particular embodiments, as described in the dependent claims and the following introduction of the description.

In embodiments, the measured value criterion comprises that the measured value is an arm structure acceleration value which is greater than a threshold acceleration value, in particular during a threshold time value. To this end, the milking robot is provided with a sensor which is capable of measuring this arm structure acceleration value, which will be discussed in more detail later. In this case, the threshold acceleration value may be chosen on the basis of practical measurements in order to thus be able to differentiate between accelerations resulting from actuated arm structure movements and movements which are caused by external effects, in particular kicks from a dairy animal. Partly because the control unit of the arm structure makes it possible to exactly predict the intended movements, it is also possible in embodiments for the measured value to be a net arm structure acceleration value, with the arm structure acceleration value of intended movements being subtracted.

In many cases, the arm structure will comprise a plurality of arm structure parts which are movable with respect to each other. Advantageously, the arm structure acceleration value is an acceleration value of the arm structure part to which the teat cup is (directly) connected via the connecting means. This is due to the fact that the movement of this arm structure part largely determines whether the distance between the teat cup and this arm structure part risks becoming too great. Nevertheless, it is also possible to measure an acceleration value of other arm structure parts in order to determine on the basis thereof whether the criterion has been met, in particular therefore whether the distance between arm structure and teat cup risks becoming too great.

In particular, the measured value criterion comprises that the measured value is a vertical arm structure acceleration value, more particularly directed downwards, which is greater than a vertical threshold acceleration value. The vertical arm structure acceleration is important because a kick by a dairy animal is often also directed downwards and the animal is also often able to use greater force. In addition, the arm structure generally moves more in the horizontal direction than in the vertical direction, partly because the udder and thus the teats will remain at approximately the same height, even if the dairy animal moves to and fro. Nevertheless, the measured value criterion may alternatively or additionally comprise that the measured value is a horizontal arm structure acceleration value which is greater than a threshold value. The sensor for measuring the vertical arm structure acceleration value is then, for example, a sensor which specifically measures this vertical value, or a sensor which measures a total acceleration value as well as the direction, so that the vertical component can be derived therefrom as

|acceleration value|×cosine(angle of acceleration to the vertical).

The sensors which may be used are explained in more detail later in this text.

In embodiments, the measured value criterion depends on a time-derivative value of the arm structure position value with respect to the frame and/or with respect to the dairy animal to be milked. In this case, a time-derivative value is in fact understood to mean the speed. To this end, an arm structure speed sensor may be provided, but it is also possible for the control unit to be configured to determine the time-derivative value, or speed value, from repeatedly measured arm structure position values. Due to the fact that the criterion depends on this time-derivative value, it is possible to take into account movements of, for example, the dairy animal to be milked which have already started. Thus, the arm structure will be outside the reach of the teat cup more quickly or with a smaller additional movement if the arm structure and this teat cup of the dairy animal to be milked move away from each other than when they move towards each other, and vice versa.

In embodiments, the measured value criterion depends on an arm structure position value with respect to the frame and/or with respect to the dairy animal to be milked. In the former case, this means that, for example, the or each predetermined measured value range depends on the arm structure position value, and advantageously changes simultaneously with a change in the arm structure position value. After all, the arm structure may be near its extreme position, so that a small further movement or kick by the dairy animal may already result in tension on the connecting means, possibly followed by pulling loose of the teat cup. If, however, by contrast, the arm structure is situated in the center of its movement range, there is often a much greater tolerance. Therefore, the acceptable limits, and thus the measured value criterion, may differ for each arm structure position. In the latter case, this means that the tolerance with respect to the dairy animal to be milked may be smaller, depending on the arm structure position with respect to this dairy animal. This is due to the fact that, if the arm structure is situated, for example, relatively far to the back (or to the front, or low) with respect to the dairy animal to be milked, only a small additional movement is required to take the teat cup outside the reach of the connecting means. In both cases, in particular the measured value criterion depends on the arm structure position value in a longitudinal direction of the frame or a vertical direction.

In embodiments, the arm structure position-determining device comprises an optical or ultrasound camera comprising image recognition software. Using such a camera, it is possible not only to accurately and quickly determine a position of the arm structure, but also of a dairy animal or a part thereof, such as a teat or udder. To this end, the camera is preferably attached to either the frame or another fixed point, which is advantageous in terms of calibration. Using the image recognition software, which is known per se from, for example, automatic teat recognition in robot milking, the position of the arm structure, the teat cup, etc. with respect to the camera can be determined. The optical camera is preferably a stereo camera, such as a 3D camera (time-of-flight or the like).

In embodiments, the arm structure position-determining device comprises at least one position feedback device which is operatively connected to the actuator or actuators. Such a position feedback device is often incorporated as standard as a component of the arm structure control unit and comprises, for example, inductive or optical signal generators. Obviously, such a device may be used with the invention to indicate the arm structure position. Again, as has been the case for the entire invention, the term "arm structure" is in this case understood to mean in particular the part of the arm structure which is connected to the connecting means. In addition, it should be noted here that any other arm structure position-determining device known from the prior art can be used.

In embodiments, the milking robot furthermore comprises a dairy animal position-determining device. In this case, the dairy animal position-determining device may be configured to determine a position of the dairy animal or a position of a part of the dairy animal. In this case, it is assumed that the position of the entire dairy animal largely determines the position of any part of the dairy animal. Nevertheless, there may be variations on the basis of movements. The dairy animal position-determining device may comprise a center of gravity-determining device, such as the weighing floor comprising a plurality of weighing sensors of the Lely Astronaut A3 milking robot. Alternatively or additionally, the dairy animal position-determining device may comprise, as already indicated above, an optical or ultrasound camera with image recognition software. An important observation is that the milking robot may alternatively or additionally comprise a differential position-determining device which is configured to determine a distance between the arm structure and the teat cup on a teat of the dairy animal to be milked and which is connected thereto via the connecting means. To this end, the differential position-determining device may be configured as an optical or ultrasound camera, such as a 3D camera, comprising image recognition software, and/or may be configured as two separate position-determining devices, as already described above, for the positions of the arm structure and of the dairy animal to be milked or part thereof or the teat cup, respectively, wherein the control unit is configured to determine said distance from the positions determined. Furthermore, the control unit may be configured to determine a relative speed or acceleration of the arm structure with respect to said teat cup, for example, by analyzing the repeatedly determined relative distance between the two, and wherein the measured value criterion depends on at least one of the determined relative distance, speed or acceleration between the arm structure and the teat cup, which is explained at greater length below.

In embodiments, the milking robot comprises an acceleration-measuring device configured to determine an arm structure acceleration value of the arm structure, in particular of a part of the arm structure which is connected to the connecting means. By means of such an acceleration-measuring device, the milking robot, at least the control unit operatively connected thereto, is able to determine the acceleration value(s) required for at least a number of the possible measured value criteria. Direct determination or measurement of the value may be more accurate or quicker than deriving it on the basis of certain positions. Nevertheless, in embodiments, the acceleration-measuring device is configured to determine the acceleration from images of the arm structure which are determined repeatedly by the arm structure position-determining device. The acceleration may in this case again be "absolute", that is to say with respect to the frame or another fixed point, or "relative", that is to say with respect to the teat cup. The acceleration-measuring device may in this case function on the basis of camera images and image recognition software, wherein the acceleration is determined, for example, by image analysis, such as a second derivative with respect to the time of the position of the arm structure etc. For example, a triaxial acceleration sensor with axes which are perpendicular with respect to each other is provided as acceleration-measuring device. When stationary, it will, for example, indicate 1 g as the sum of the three accelerations. Preferably, one axis is directed vertically, and indicates 1 g, and the other two each zero. When accelerated by a kick or the like, the sum of the accelerations will be different from 1 g and it is possible to determine the direction of the acceleration and then the direction of the movement, by means of the three individual acceleration values. Such acceleration sensors can be provided in an inexpensive manner, for example, on the basis of micro(electromechanical) systems (MEMS or MST systems).

In alternative or additional embodiments, the milking robot comprises an acceleration sensor on the arm structure, in particular on a part of the arm structure which is connected to the connecting means. The acceleration sensor provided on the arm structure may directly determine the acceleration of this arm structure (or the part thereof), which may in principle be most accurate. Such acceleration sensors are, for example, piezocapacitive, piezoresistive or piezoelectrical sensors.

In particular, the connecting means comprises a cord or chain, but possibly also the milk and/or vacuum line of the respective teat cup. Such connecting means are strong, flexible and resistant to wear. In this case, "flexible" is understood to mean that the connecting means is pliable in at least one plane or direction, such as the chains with cubes of the GEA DairyProQ, or in all directions, such as the cord of the Lely Astronaut®. Nevertheless, any other connecting means having the abovementioned properties may also be used.

The retracting device comprises in particular a tensioning or winding device. These are known per se in the prior art, such as in the Lely Astronaut® milking robots.

In embodiments, the milking robot comprises a plurality of teat cups, in particular four milking cups, wherein the control unit is configured to control the vacuum device for closing off the milking vacuum of the plurality of teat cups, if the determined measured value satisfies the predetermined measured value criterion, and in particular also to control the retracting device to pull back, more particularly subsequently, the plurality of teat cups onto the arm structure. In this case, use is made of the consideration that the arm structure should pull all teat cups from the teats if that is true for one of the teat cups. In order to then avoid unnecessary soiling of the others, it is advantageous to then protect all teat cups against soiling by disconnecting the respective milking vacuum and/or pulling back the teat cups. In addition, this will result in rest for the dairy animal more quickly, since any form of further irritation is limited as much as possible by completely detaching the milking robot components. It should also be noted that, in the prior art, as described above, changes in the air flow through the teat cups are used, in which case an increase indicates that the teat cups have been kicked off. When this happens to four teat cups simultaneously, the milking vacuum may be reduced to such a degree that the air flow may increase to a lesser degree than is necessary to determine that the teat cups have been kicked off. The present invention is also advantageous in those cases, as it may be completely independent from this air flow.

The invention will now be explained in more detail with reference to the drawing which shows and explains some non-limiting embodiments, and in which FIG. 1 shows a diagrammatic side view of a milking robot according to the invention;

Figure 1:
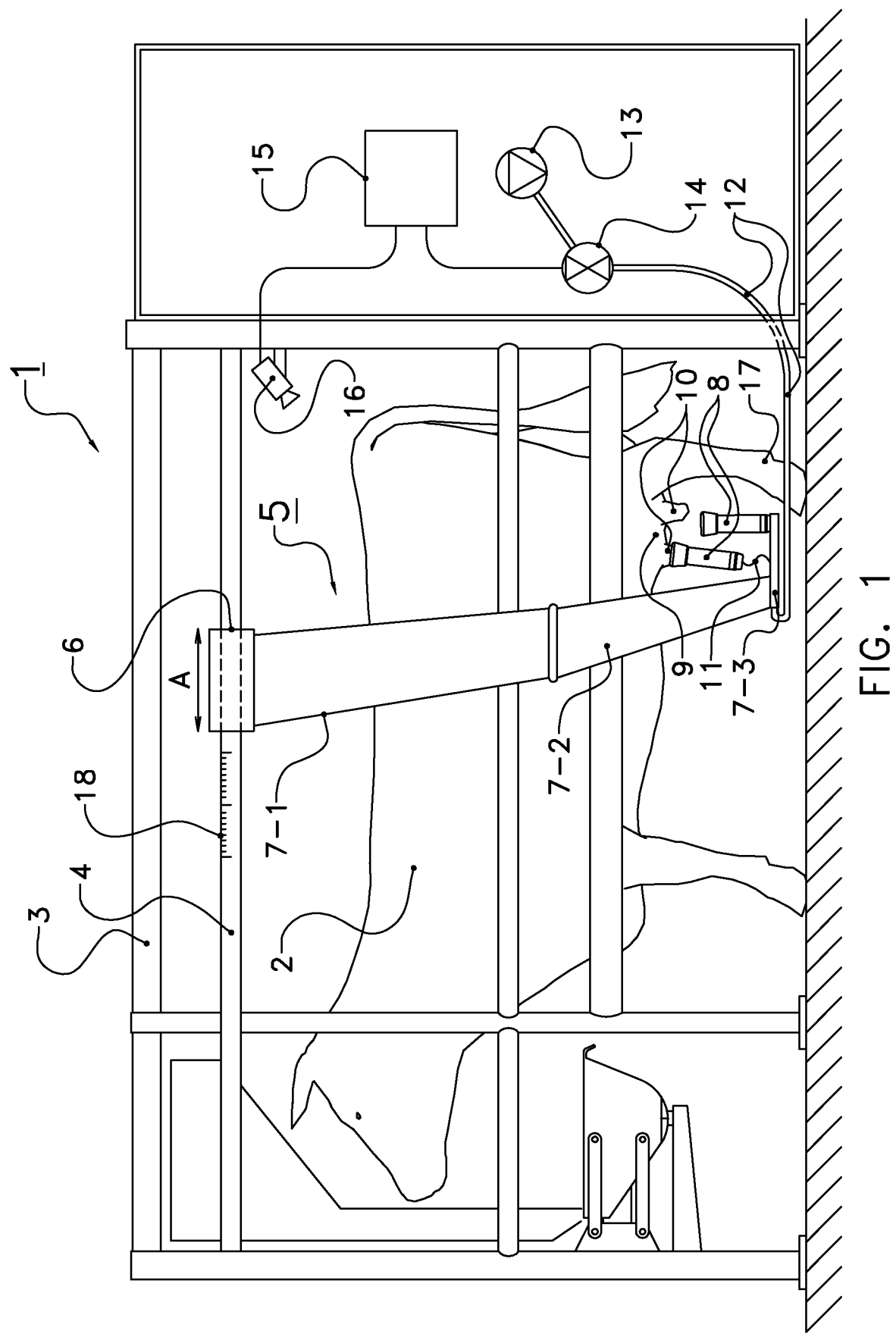

FIG. 1 shows a diagrammatic side view of a milking robot 1 according to the invention during milking of a cow 2. The milking robot 1 comprises a frame 3 with a guide rail 4 from which a robot arm 5 is suspended. The robot arm 5 comprises a trolley 6 which can move in the direction of the double arrow A and robot arm parts 7-1, 7-2 and 7-3. Milking cups 8 are placed on the bottom robot arm part 7-3 and one of them is connected to a teat 10 of an udder 9 here. Reference numeral 11 denotes a cord and reference numeral 12 a vacuum hose in which a vacuum can be created by means of a pump 13. Reference numeral 14 denotes a valve which is controllable by a control unit 15. Reference numeral 16 denotes a camera and reference numeral 17 a leg of the dairy animal 2. Reference numeral 18 furthermore denotes a position indication.

The milking robot 1 is only shown highly diagrammatically here. Thus, components which are not relevant to the invention are not shown, such as a feeding trough, fences, etc. The illustrated milking robot has a displaceable robot arm 5 which can attach milking cups 8 to teats 10 by means of a teat-detecting device (not shown here). Such a teat-detecting device is known per se and reference is made to the prior art for details. In order to attach the milking cups 8, the robot arm 5 is displaceable in its entirety along guide rail 4 by means of the trolley 6. The various parts of the robot arm 7-1, 7-2 and 7-3 are also movable with respect to each other, e.g. hingable, by means of actuators (not shown here). For these, reference is likewise made to the prior art, such as to the Lely Astronaut® milking robots.

In the illustrated situation, a teat cup 8 is, for example, attached to a teat 10 while a second teat cup is still on a part 7-3 of the robot arm 5. In case the cow 2 steps with its leg 17 on the robot arm 5, usually part 7-3, e.g. because it is irritated by the milking cups or insects or the like, then the already attached milking cup 8 may be kicked off the teat. However, this milking cup has a certain degree of freedom with respect to the part 7-3 of the robot arm 5. This freedom of movement results from the fact that the connection with the robot arm 5 is only provided via a cord 11. This cord 11 normally serves to pull the milking cup 8 back onto the part 7-3 of the robot arm, using retracting means (not shown here). But this freedom of movement is limited and, depending on the cord length and, for example, the height of the teats above the floor, this limited freedom of movement could, during milking and subsequent kicking off of the milking cups, result in the teat cup falling on the ground and becoming soiled. The invention aims to reduce the risk of soiling of the milking cups after they have been kicked off.

To this end, the milking robot 1 comprises for example a camera 16. This camera records images of relevant objects, such as in particular the robot arm 5, or in particular the bottom part 7-3 thereof, and, for example, but not necessarily a leg 17 or a milking cup 8. The repeatedly recorded images are analyzed by means of image-processing software provided in the control unit 15 in order to determine an absolute position of the objects or a relative position therefrom, such as a distance between objects. To this end, the camera 16 is advantageously a 3D camera or ultrasound sensor or camera.

In this example, the camera 16 is rigidly connected to the frame 3 and therefore well placed to determine an absolute position of a detected object with respect to the frame. Thus, by repeatedly recording an image of, for example, the part 7-3 of robot arm 5, it is possible to repeatedly determine a position of said component. Thus, it is for example also possible to determine an acceleration value for that part 7-3. To this end, it suffices to determine a second derivative with respect to the time of the position. The control unit 15 is advantageously configured to this end.

If the acceleration value of the robot arm part which has thus been determined exceeds a threshold value, the control unit 15 may conclude that the robot arm 5, in particular the part 7-3, has been given a kick which is so strong that the resulting movement will push the robot arm so far downwards and/or sideways that the milking cups 8 which are attached to teats 10 will be pulled off. As has been described above, this could result in the milking system becoming soiled. In order to prevent this from happening, the control unit 15 will then, for example, close off a vacuum (in particular the milking vacuum) to the milking cups 8, such as, for example, by switching the valve 14 or, if desired, switching off the pump 13. Alternatively and/or additionally, it is possible to pull the attached milking cups 8 back onto the part 7-3 by means of retracting means (not shown here) by tensioning the cord 11. It should be noted that said actions may already be performed before the milking cups 8 actually become detached, so that the risk of soiling is significantly reduced.

An acceleration or other relevant parameter value for the robot arm 5 or a component, such as component 7-3 thereof, may also be determined in a different way. An acceleration value for the robot arm may, for example, be determined by means of position-measuring devices for the robot arm 5 and its components 7. To this end, devices are, for example, accommodated in the milking robot 1, such as the position indication 18. This is only a diagrammatic representation of a device for determining a position of a robot arm component, in this case the trolley 6, wherein the position indication in the form of a bar system can indicate the position along the arrow A to the control unit 15. Furthermore, in or near the actuators (not shown here) for moving the robot arm parts 7-1, 7-2 and 7-3, position feedback devices may be provided which can send respective signals to the control unit 15, which in turn may be configured to determine the position of the respective components 7-1, 7-2, 7-3. This is known per se in the prior art and, for example, useful to control the robot arm 5 to move to a desired position. During this controlling to a desired position, the respective actuators will be controlled accordingly, with the position feedback device(s) passing on the result of the control action of the actuators as control to the control unit. In this case, the respective position feedback devices may also serve to record an unexpected movement and thus change in position, on the basis of which the control unit 15 may then determine one or more values for a relevant parameter, such as an acceleration of the robot arm 5 or a component 7-3 thereof, or a speed or a position thereof. An unexpected movement relates to a movement which is not programmed or controlled by the control unit.

Figure 2:
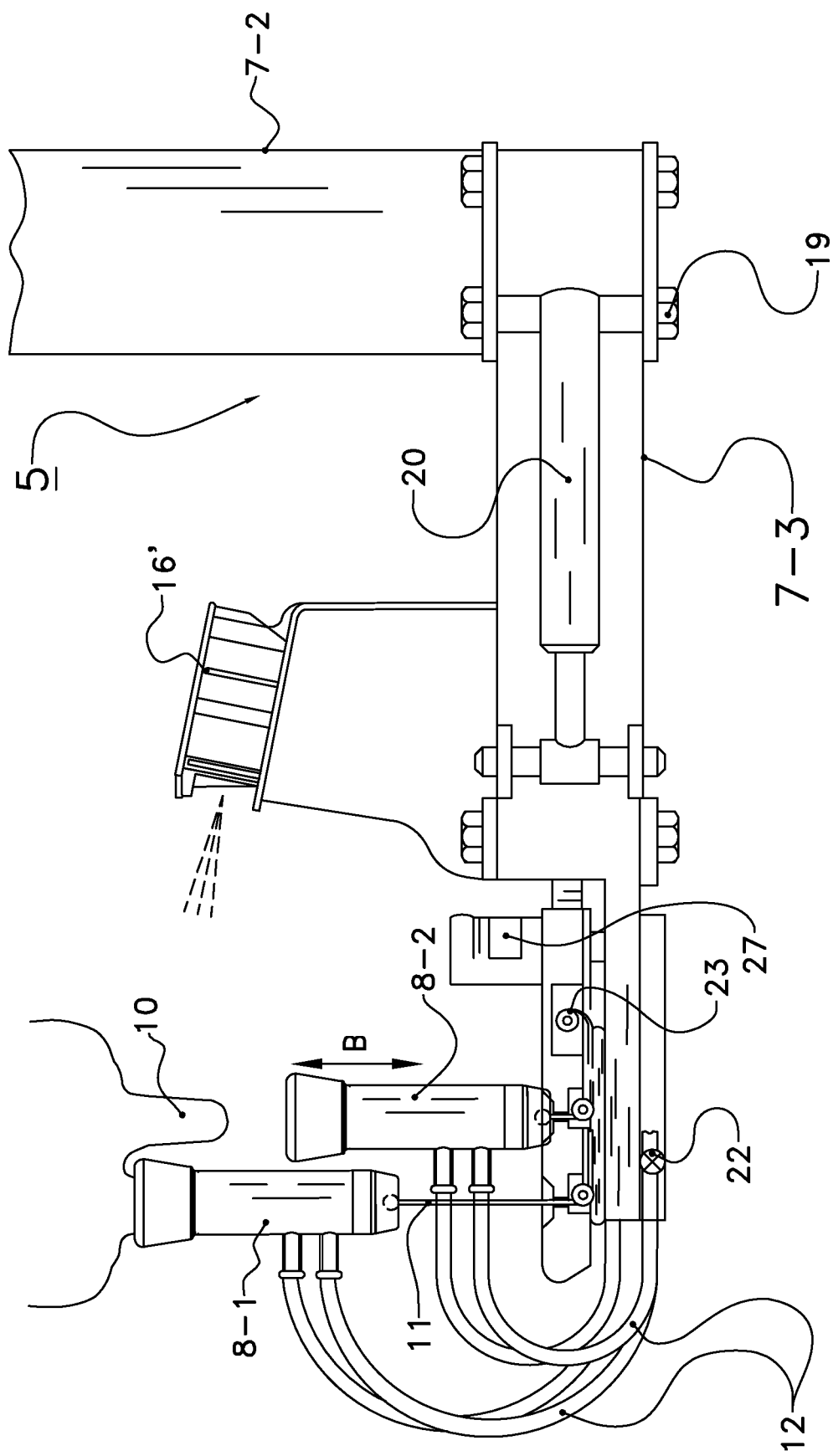
FIG. 2 shows a diagrammatic detail of a milking robot according to the invention.

FIG. 2 shows a diagrammatic side view of a detail of the milking robot 1. In this case, it should be noted that similar components are denoted by the same reference numeral, optionally provided with a sub-indication. FIG. 2 shows components 7-2 and 7-3 of the robot arm 5 with milking cups 8-1 and 8-2 thereon. Milking cup 8-1 is attached to a teat 10 and has freedom of movement with respect to robot arm part 7-3 by means of the cord 11. Milking cup 8-2 may still be attached to the teat 10 by moving the robot arm 5 upwards in the direction of the arrow B.

In addition, an actuator 20 is shown which can move the components 7-2 and 7-3 about a hinge 19 with respect to each other. Furthermore, reference numeral 21 denotes an acceleration sensor and reference numeral 22 denotes a valve in the vacuum hose 12. Finally, reference numeral 16 denotes a camera. Reference numeral 23 denotes a retracting device.

In this case, this camera 16 is a 3D camera. The 3D camera 16 may serve to recognize the teats 16 and to move the robot arm 5, in particular the milking cups 8, towards the teats, for example, by minimizing the mutual distance.

In this case as well, a cow or other dairy animal could kick in particular component 7-3 or another component of the robot arm 5. Here, the associated displacement, speed or acceleration can also be determined in many ways. For example, the 3D camera 16 may detect a sudden acceleration or displacement due to the fact that the objects in the image undergo a displacement in an upward or lateral direction or the like. The displacement and/or acceleration can be determined from the displacement or acceleration of the objects with respect to reference objects. The reference objects are, for example, fixedly arranged parts of the milking robot, such as frame parts, or also parts of machines or the dairy animal which is not directly involved in the kicking action, assuming that these objects themselves will be (approximately) stationary in the space. After all, an udder with teats 10 and milking cups 8-1 attached thereto will be substantially stationary in the space, at least in a vertical direction, while the robot arm 5 will undergo a displacement and acceleration due to the kick, as will the kicking leg. Since the 3D camera 16 is connected to the robot arm 5, this camera will undergo the same displacement or acceleration. As a result thereof, objects which should be virtually stationary in the image, such as the attached milking cup 8-1 and/or the teats 10, move upwards in the frame. By measuring this change in position in the image by means of image recognition software, the control unit is able to determine if the robot arm 5 has been given a kick and can consequently take action. For example, when a predetermined threshold speed or threshold acceleration is exceeded, the control unit (not shown here) will be able to close a respective valve 22 in the vacuum hose 12 to an attached milking cup 8-1. It should be noted that this valve 22 in principle has the same action as the valve 14 in FIG. 1, but that its action is now improved, due to the fact that it now works per milking cup 8 due to the fact that it is situated closer to the milking cup 8.

The 3D camera 16 may also be another 3D camera or an ultrasound sensor or camera or the like. As an alternative for a camera 16, at least with regard to measuring an acceleration or the like, FIG. 2 shows an acceleration sensor 21. This is mounted on the arm part 7-3 of the robot arm 5 and determines the acceleration of said component.

The camera may also determine that the robot arm 5 has been kicked if the distance between an attached milking cup 8-1 and 8-2 which is still situated on the part 7-3 of the robot arm increases (too) quickly, that is to say wherein the acceleration, for example determined as a second time-derivative parameter, exceeds a threshold value.

Also if the acceleration sensor 21 measures an acceleration which exceeds a certain threshold acceleration value, the control unit coupled to the acceleration sensor 21 will come to the conclusion that the dairy animal has performed a kick, and start a desired action.

As already indicated above, one possible action is closing a valve 22. Alternatively and/or additionally, the control unit may activate a retracting device 23 which may tension the cord 11 of, in particular, attached milking cups 8-1 and can thus pull the milking cup 8-1 back onto the component 7-3 to prevent it from falling onto the ground or otherwise becoming soiled.

In addition to the abovementioned action, it is, for example, also possible to take the action of cleaning or disinfecting milking cups, as is conventional per se after it has been detected that they have been kicked off, and/or separating the milk for calves or the like, since soiling cannot always be excluded. It should furthermore be noted here that it is also possible to teach the control unit how an individual dairy animal kicks, so that the control unit can take this into account with regard to the position of the arm before, during or after a certain action, such as milking.

Figure 3A:
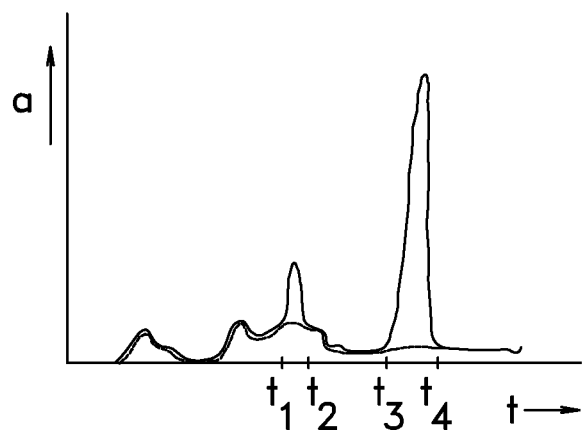
FIGS. 3a and 3b show diagrams of the acceleration as a function of time.
Figure 3B:
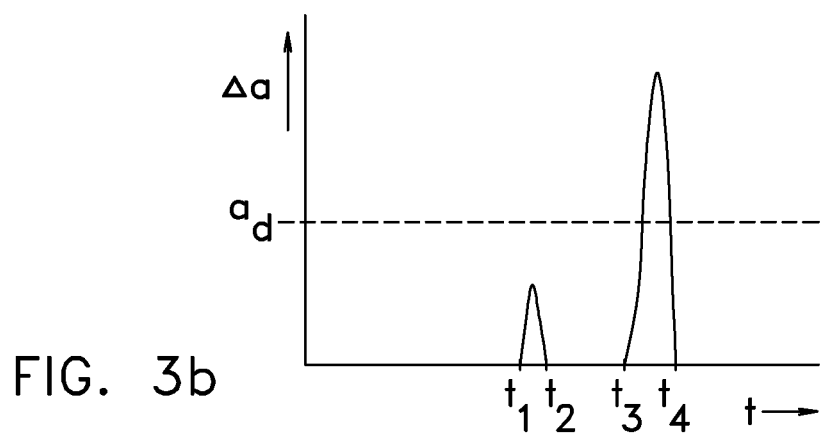

FIGS. 3a and 3b diagrammatically show a time/acceleration diagram for the part 7-3 of the robot arm 5. In this case, arbitrary units have been used. In FIG. 3a, the solid line indicates the acceleration determined by, for example, the acceleration sensor 21 from FIG. 2 and the dashed line indicates an acceleration which is associated with movements which the control unit imposes on the robot arm.

If the robot arm were not subjected to any external, that is to say non-controlled, force, the dashed line and the solid line would coincide. However, as can be seen, the acceleration value measured between instants t1 and t2 and between instants t3 and t4 is higher than expected on the basis of the controlled movements. Between these instants, the robot arm is therefore subjected to an external influence.

Figure b shows this external influence in more detail by reducing the measured acceleration (the solid line) by the expected acceleration (the dashed line). As can be seen, there are two peaks, obviously between t1 and t2, and between t3 and t4. It can furthermore be seen that the first peak is relatively low, at least remains considerably below the predetermined threshold value $a_d$. The second peak, between the instants t3 and t4, is significantly higher and clearly exceeds the predetermined threshold value $a_d$. The first peak is, for example, caused by a collision of the robot arm or a component thereof with the cow on the basis of an autogenerated movement, while the higher, second peak is caused by a kick of the cow. It will be clear that it is undesirable to perform an action which, although it will prevent soiling, will also end milking in the case of an acceleration which is below a predetermined threshold value $a_d$. On the other hand, in the case of an acceleration which indicates that kicking, followed by the milking cup detaching from the teat, is highly likely, such an action is desired. On the basis of these considerations, the predetermined threshold value $a_d$ may be determined, as in practice, on the basis of the free length of the cord 11 and the like.

Figure 4:
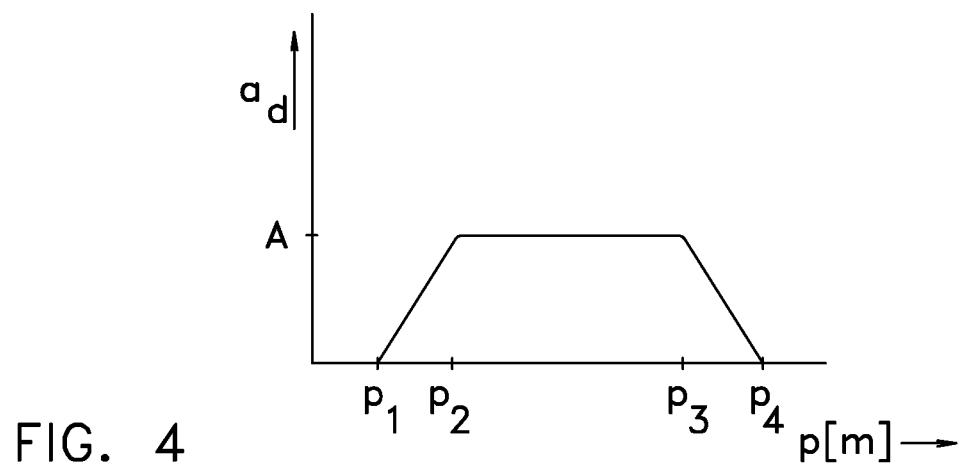
FIG. 4 shows a diagram of a threshold acceleration as a function of a parameter p.

FIG. 4 diagrammatically shows a diagram of a threshold value for the acceleration $a_d$ as a function of a parameter value p. The parameter p may in this case, for example, be a height of the robot arm above the floor or a position of the milking robot 1 in the longitudinal direction. The threshold acceleration value $a_d$ is then a function of this parameter value. In this example, the threshold value $a_d$ equals 0 if the parameter p is outside the range p1 to p4. The threshold value $a_d$ equals A if the parameter value p is between p2 and p3, and the threshold value $a_d$ increases linearly from 0 to A if the parameter value p runs from p1 to p2 and from p4 to p3, respectively.

This graph shows that the threshold value does not always have to be the same, but may depend on another parameter value. For example, when the robot arm nears the end of its range, a relatively small acceleration may already result in the measuring cups becoming detached. When, for example, the height of the robot arm under the height of the teats (i.e. the intermediate distance) increases, the risk of the milking cups being kicked off increases. This is due to the fact that the free length between attached milking cups 8 and the part 7-3 of the robot arm 5 is limited as a result of a limited length of the cord 11. In this case as well, already a relatively small acceleration may result in the milking cups 8 becoming detached. Obviously, other functions for the acceleration threshold value $a_d$ as a function of a parameter value are also possible. Furthermore, it would also be possible to consider a speed value instead of an acceleration value $a_d$, or the threshold acceleration value $a_d$ could be determined as a function of a measured speed of the robot arm 5, if desired in combination with a position or another parameter value p, as in FIG. 4. Any combination thereof is conceivable.

The exemplary embodiments illustrated in the drawing and the description thereof given above are by no means intended to limit the invention. Rather, the scope of protection of the invention is determined by the attached claims.

The invention claimed is:

1. A milking robot for completely automatically performing a teat-related action on a dairy animal, comprising:
   a frame with an arm structure which is movable with respect thereto and comprising a robot arm and one or more actuators for moving the arm structure,
   a teat cup,
   a flexible connecting means connected between the teat cup and the arm structure,
   a retracting device for pulling the teat cup back onto the arm structure by means of the connecting means,
   a vacuum device for applying a milking vacuum to the teat cup,
   a control unit for controlling the milking robot, and
   at least one of an arm structure position-determining device for determining a measured value relating to an arm structure position, and an arm structure acceleration-determining device for determining a measured value relating to an arm structure acceleration,
   wherein the control unit is configured to control the retracting device for pulling back the teat cup onto the arm structure and/or to control the vacuum device for closing off the milking vacuum from the teat cup, if either the determined measured value relating to the arm structure position satisfies a predetermined measured value position criterion or the determined measured value relating to the arm structure acceleration satisfies a predetermined measured value acceleration criterion.

2. The milking robot as claimed in claim 1, wherein the measured value acceleration criterion comprises that the measured value is an arm structure acceleration value which is greater than a threshold acceleration value.

3. The milking robot as claimed in claim 2, wherein the threshold acceleration value is a threshold time value.

4. The milking robot as claimed in claim 1, wherein the measured value position criterion depends on an arm structure position value with respect to the frame.

5. The milking robot as claimed in claim 1, wherein the measured value position criterion depends on a time-derivative value of an arm structure position value with respect to the frame and/or with respect to the dairy animal to be milked.

6. The milking robot as claimed in claim 1, wherein the arm structure-position-determining device comprises an optical or ultrasound camera comprising image recognition software.

7. The milking robot as claimed in claim 1, wherein the arm structure position-determining device comprises at least one position feedback device which is operatively connected to the actuator or actuators.

8. The milking robot as claimed in claim 1, furthermore comprising a dairy animal position-determining device.

9. The milking robot as claimed in claim 1, wherein the acceleration-measuring device is configured to determine the acceleration from images of the arm structure which are determined repeatedly by the arm structure position-determining device.

10. The milking robot as claimed in claim 1, further comprising an acceleration sensor on the arm structure.

11. The milking robot as claimed in claim 10, wherein the acceleration sensor on the arm structure is on a part of the arm structure which is connected to the connecting means.

12. The milking robot as claimed in claim 1, further comprising a plurality of teat cups.

13. The milking robot as claimed in claim 12, wherein the plurality of teat cups comprise four teat cups.

14. The milking robot as claimed in claim 12, wherein the control unit is configured to control the vacuum device for closing off the milking vacuum of the plurality of teat cups if the determined measured value satisfies either predetermined measured value criterion, and subsequently to control the retracting device to pull back the plurality of teat cups onto the arm structure.

15. The milking robot as claimed in claim 1, wherein the teat related action comprises milking.

16. The milking robot as claimed in claim 1, wherein the teat cup comprises a milking cup.

17. The milking robot as claimed in claim 1, wherein the acceleration-measuring device is configured to determine an arm structure acceleration value of a part of the arm structure which is connected to the connecting means.

18. A milking robot for completely automatically performing a teat-related action on a dairy animal, comprising:
- a frame with an arm structure which is movable with respect thereto and comprising a robot arm,
- a teat cup,
- a retracting device for pulling the teat cup back onto the arm structure,
- a vacuum device for applying a milking vacuum to the teat cup,
- a control unit for controlling the milking robot, and
- an arm structure acceleration-determining device for determining a measured value relating to an arm structure acceleration,
- wherein the control unit is configured to control the retracting device for pulling back the teat cup onto the arm structure and/or to control the vacuum device for closing off the milking vacuum from the teat cup, if the determined measured value satisfies a predetermined measured value acceleration criterion.

19. The milking robot as claimed in claim 18, wherein the measured value acceleration criterion is an arm structure acceleration value which is greater than a threshold acceleration value.

20. A milking robot for completely automatically performing a teat-related action on a dairy animal, comprising:
- a frame with an arm structure which is movable with respect thereto and comprising a robot arm,
- a teat cup,
- a retracting device for pulling the teat cup back onto the arm structure,
- a vacuum device for applying a milking vacuum to the teat cup,
- a control unit for controlling the milking robot, and
- an arm structure position-determining device for determining a measured value relating to an arm structure position,
- wherein the control unit is configured to control the retracting device for pulling back the teat cup onto the arm structure and/or to control the vacuum device for closing off the milking vacuum from the teat cup, if the determined measured value satisfies a predetermined measured value position criterion.

* * * * *